US012683923B2

(12) United States Patent
Kweon

(10) Patent No.: US 12,683,923 B2
(45) Date of Patent: Jul. 14, 2026

(54) METHOD AND APPARATUS FOR CONTROLLING INTERNET PROTOCOL FLOW FOR AF SERVICE IN WIRELESS COMMUNICATION SYSTEM

(71) Applicant: SAMSUNG ELECTRONICS CO., LTD., Suwon-si (KR)

(72) Inventor: Kisuk Kweon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 69 days.

(21) Appl. No.: 18/759,482

(22) Filed: Jun. 28, 2024

(65) Prior Publication Data

US 2025/0007875 A1     Jan. 2, 2025

(30) Foreign Application Priority Data

Jun. 30, 2023    (KR) ........................ 10-2023-0085088

(51) Int. Cl.
| | |
|---|---|
| *H04L 61/256* | (2022.01) |
| *H04L 61/2514* | (2022.01) |
| *H04W 76/38* | (2018.01) |

(52) U.S. Cl.
CPC ........ *H04L 61/256* (2013.01); *H04L 61/2514* (2013.01); *H04W 76/38* (2018.02)

(58) Field of Classification Search
None
See application file for complete search history.

(56) References Cited

U.S. PATENT DOCUMENTS

| | | | |
|---|---|---|---|
| 2003/0039212 A1 | 2/2003 | Lloyd et al. | |
| 2012/0011189 A1* | 1/2012 | Werner | H04L 61/2575 |
| | | | 709/227 |

(Continued)

FOREIGN PATENT DOCUMENTS

| | | | | |
|---|---|---|---|---|
| EP | 3829142 A1 | 6/2021 | | |
| JP | 2020515157 A * | 5/2020 | | H04W 68/00 |
| WO | WO-2024032913 A1 * | 2/2024 | | H04W 48/14 |

OTHER PUBLICATIONS

International Search Report and Written Opinion of the International Searching Authority dated Oct. 4, 2024, in connection with International Application No. PCT/KR2024/009080, 6 pages.

(Continued)

*Primary Examiner* — Phyllis A Book

(57) ABSTRACT

The disclosure relates to a 5G or 6G communication system for supporting a higher data transmission rate. Disclosed is a method of operation by a first network entity in a wireless communication system. The method includes transmitting a first request message for a list of services which can be provided to the first network entity and type information of network address translation (NAT) to a second network entity having an NAT function, receiving a first response message including the list of the services which can be provided to the first network entity and the type information of the NAT from the second network entity, transmitting an operation indication message related to a timer of IP address mapping information managed by the NAT to the second network entity, and receiving a response message to the operation indication message from the second network entity.

14 Claims, 10 Drawing Sheets

(56) References Cited

U.S. PATENT DOCUMENTS

| | | | |
|---|---|---|---|
| 2013/0110938 A1* | 5/2013 | Werner | H04L 63/104 |
| | | | 709/205 |
| 2014/0341109 A1* | 11/2014 | Cartmell | H04L 43/50 |
| | | | 370/328 |
| 2017/0164286 A1* | 6/2017 | Jeong | H04W 52/0258 |
| 2018/0270895 A1* | 9/2018 | Park | H04W 76/38 |
| 2019/0373581 A1* | 12/2019 | Ryu | H04W 68/00 |
| 2022/0024607 A1* | 1/2022 | Leitch | B64F 5/60 |
| 2022/0377043 A1 | 11/2022 | Yang et al. | |
| 2023/0018917 A1 | 1/2023 | Zong et al. | |
| 2023/0074358 A1 | 3/2023 | Xiong | |

OTHER PUBLICATIONS

3GPP TS 23.501 V18.2.1 (Jun. 2023) Technical Specification, 3rd Generation Partnership Project; Technical Specification Group Services and System Aspects; System architecture for the 5G System (5GS); Stage 2 (Release 18) Jun. 2023, 684 pages.

* cited by examiner

| Private IP | Public IP |
|---|---|
| 10.143.110.5 | 192.110.33.5 |

METHOD AND APPARATUS FOR CONTROLLING INTERNET PROTOCOL FLOW FOR AF SERVICE IN WIRELESS COMMUNICATION SYSTEM

CROSS-REFERENCE TO RELATED APPLICATION

This application is based on and claims priority under 35 U.S.C. § 119 to Korean Patent Application No. 10-2023-0085088, filed on Jun. 30, 2023, in the Korean Intellectual Property Office, the disclosure of which is herein incorporated by reference in its entirety.

BACKGROUND

1. Field

The disclosure relates to a wireless communication system and, more particularly to, a method and an apparatus for controlling Internet protocol (IP) flow using a user plane (UP)-based user plane function (UPF) service for an application function (AF) service.

2. Description of Related Art $5^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mm Wave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

An aspect of the disclosure is to provide a method and an apparatus for effectively providing a service in a wireless communication system.

Another aspect of the disclosure is to provide a service for a UPF by using a user plane-based service.

Another aspect of the disclosure is to reduce network congestion and UE battery consumption due to a keepalive message transmitted from an AF to the UE.

In accordance with an aspect of the disclosure to solve problem, a method of operation by a first network entity in a wireless communication system includes transmitting a first request message for a list of services which can be provided to the first network entity and type information of network address translation (NAT) to a second network entity having an NAT function, receiving a first response message including the list of the services which can be provided to the first network entity and the type information of the NAT from the second network entity, transmitting an operation indication message related to a timer of IP address mapping information managed by the NAT to the second network entity, and receiving a response message to the operation indication message from the second network entity.

The method of the first network entity may further include transmitting a second request message making a request for at least one piece of period information of the timer, expiration time information of the timer, or expiration notification information of the timer to the second network entity and receiving a second response message corresponding to the second request message and including at least one piece of the period information of the timer, the expiration time information of the timer, or the expiration notification information of the timer from the second network entity.

When the operation indication message indicates extension or reset of the timer, the operation indication message may be controlled not to be transferred to a user equipment (UE).

The first request message or the operation indication message may be transmitted while being included in IP datagram in a form of a UPF control message protocol (UCMP) message, and a value corresponding to a UCMP may be input into a protocol field included in a header of the IP datagram.

A header of the UCMP message may include a service name field, a service operation field, and an operation semantic field.

In accordance with another aspect of the disclosure, a method of operation by a second network entity having a network address translation (NAT) function in a wireless communication system includes receiving a first request message for a list of services which can be provided to a first network entity and type information of NAT from the first network entity, transmitting a first response message including the list of the services which can be provided to the first network entity and the type information of the NAT to the first network entity, receiving an operation indication message related to a timer for IP address mapping information managed by the NAT from the first network entity, and transmitting a response message to the operation indication message to the first network entity.

In accordance with another aspect of the disclosure, a first network entity including a transceiver and a processor in a wireless communication system is provided. The processor may be configured to transmit a first request message for a list of services which can be provided to the first network entity and type information of network address translation (NAT) to a second network entity having an NAT function, receive a first response message including the list of the services which can be provided to the first network entity and the type information of the NAT from the second network entity, transmit an operation indication message related to a timer of IP address mapping information managed by the NAT to the second network entity, and receive a response message to the operation indication message from the second network entity.

In accordance with another aspect of the disclosure, a second network entity including a transceiver and a processor in a wireless communication system is provided. The processor may be configured to receive a first request message for a list of services which can be provided to a first network entity and type information of NAT from the first network entity, transmit a first response message including the list of the services which can be provided to the first network entity and the type information of the NAT to the first network entity, receive an operation indication message related to a timer for IP address mapping information managed by the NAT from the first network entity, and transmit a response message to the operation indication message to the first network entity.

Disclosed embodiments provide an apparatus and a method for effectively providing a service in a wireless communication system.

According to an embodiment of the disclosure, a message format for controlling a UPF by using a user plane-based service is disclosed.

According to an embodiment of the disclosure, an AF can extend or reset a timer related to an IP address mapping table of NAT without transmitting a keepalive message to the UE, thereby reducing network congestion and UE battery consumption due to the keepalive message transmitted to the UE.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 illustrates an example of a structure of a 5G network according to an embodiment of the present disclosure;

FIG. 6 illustrates a flow of a service Internet protocol transmitted to the UE in order to use the AF service according to an embodiment of the present disclosure;

DETAILED DESCRIPTION

Figure 1:
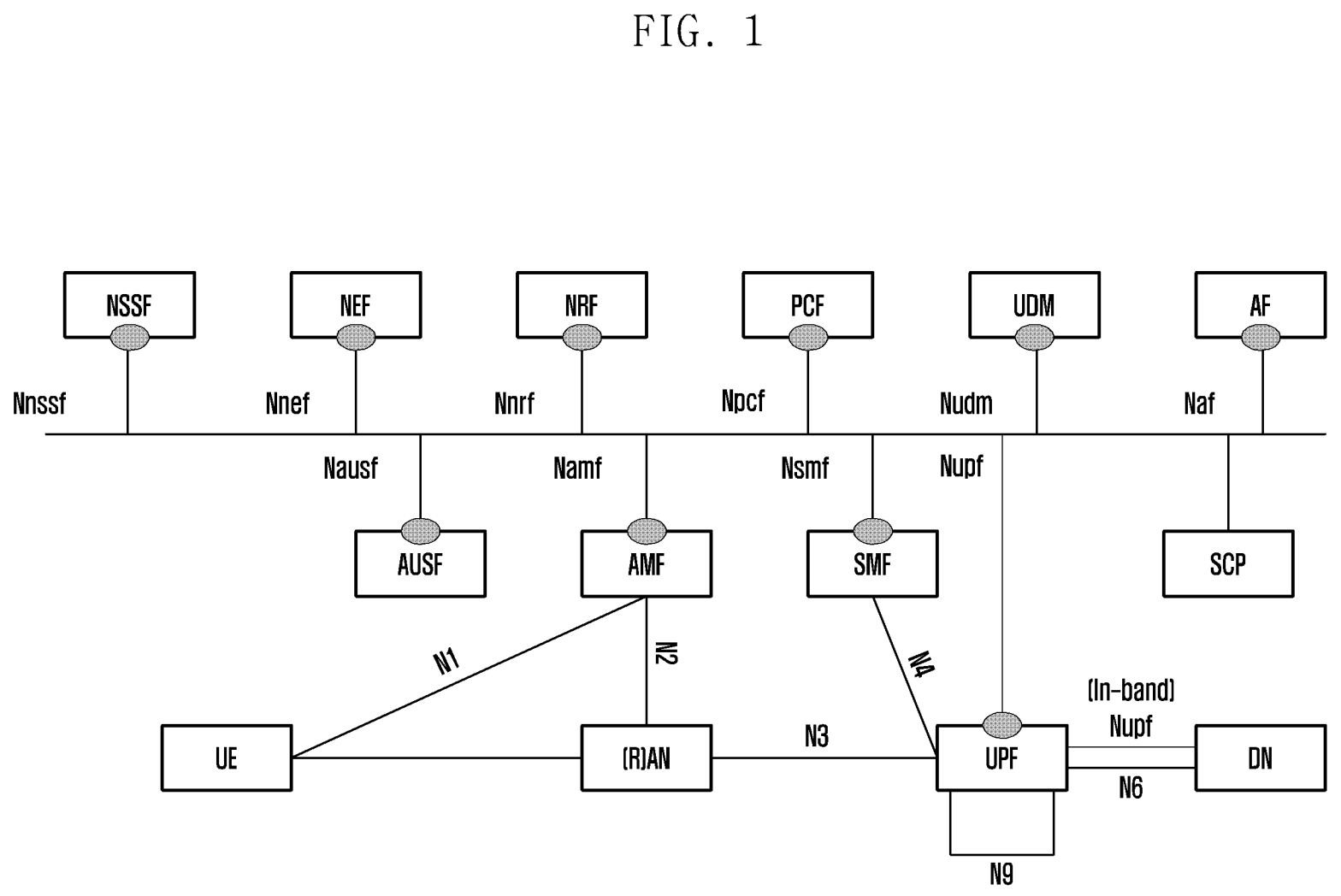
Figure 2:
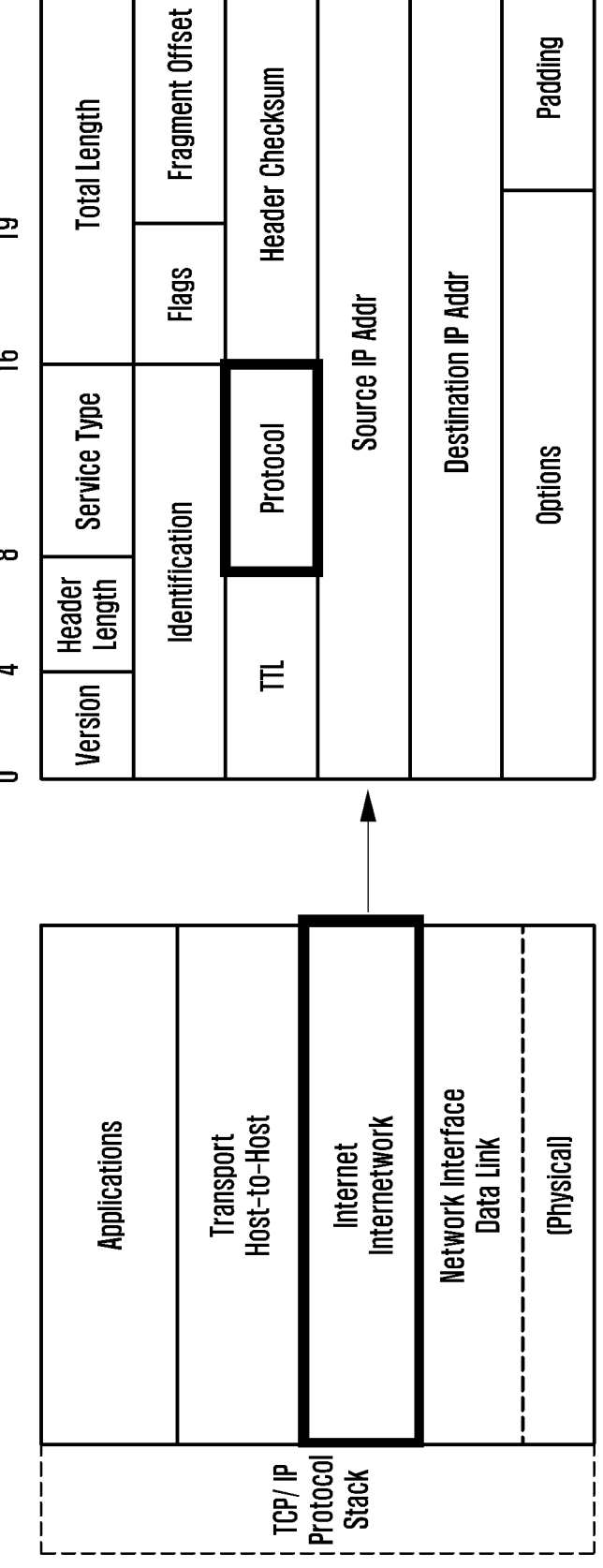
FIG. 2 illustrates an example of a TCP/IP protocol stack and an IP layer (PIv4-based) datagram header (packet header) according to an embodiment of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, exemplary embodiments of the disclosure will be described in detail with reference to the accompanying drawings. It should be noted that, in the accompanying drawings, the same or like elements are designated by the same or like reference signs as much as possible. In addition, a detailed description of known functions or configurations that may make the subject matter of the disclosure unclear will be omitted.

In describing the embodiments of the disclosure, descriptions related to technical contents well-known in the relevant art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Furthermore, the size of each element does not completely reflect the actual size. In the respective drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference signs indicate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block in the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" may be implemented to reproduce one or more CPUs within a device or a security multimedia card.

In the following description, a base station is an entity that allocates resources to terminals, and may be at least one of a Node B, a base station (BS), an eNode B (eNB), a gNode B (gNB), a wireless access unit, a base station controller, and a node on a network. A terminal may include a user equipment (UE), a mobile station (MS), a cellular phone, a smartphone, a computer, or a multimedia system capable of performing a communication function. Furthermore, the embodiments of the disclosure as described below may also be applied to other communication systems having similar technical backgrounds or channel types to the embodiments of the disclosure. In addition, based on determinations by those skilled in the art, the embodiments of the disclosure may be applied to other communication systems through some modifications without significantly departing from the scope of the disclosure.

In the following description, terms for identifying access nodes, terms referring to network entities, terms referring to messages, terms referring to interfaces between network entities, terms referring to various identification information, and the like are illustratively used for the sake of descriptive convenience. Therefore, the disclosure is not limited by the terms as described below, and other terms referring to subjects having equivalent technical meanings may also be used.

In the following description, some of terms and names defined in the 3rd generation partnership project (3GPP) standards may be used for the sake of descriptive convenience. However, the disclosure is not limited by these terms and names, and may be applied in the same way to systems that conform other standards.

Referring to FIG. 1, network entities or network nodes in a 5G network are described below.

A (radio) access node ((R)AN) is an entity that allocates radio resources of a terminal, and may be one of an eNode B, a Node B, a base station (BS), a next generation radio access network (NG-RAN), a 5G-AN, a radio access unit, a base station controller, or a node on a network.

The terminal may include a user equipment (UE), a next generation UE (NG UE), a mobile station (MS), a cellular phone, a smartphone, a computer, or a multimedia system capable of performing a communication function. Further, hereinafter, an embodiment of the disclosure is described as an example of the 5G system but can be applied to other communication systems having a similar technical background. The embodiment of the disclosure can be applied to other communication systems through some modifications without departing from the scope of the disclosure on the basis of determination by those skilled in the art.

A wireless communication system defines a NextGen core (NG core) corresponding to a new core network or a 5G core network (5GC) while evolving from the 4G system to the 5G system. The new core network virtualizes all of the existing network entities (NEs) to make a network function (NF).

According to an embodiment of the disclosure, the network function (NF) may be network entities, network components, or network resources.

According to an embodiment of the disclosure, the 5GC may include NFs illustrated in FIG. 1. Of course, the 5GC is not limited to the example of FIG. 1, but may include more or fewer NFs than the NFs illustrated in FIG. 1.

The access and mobility management function (AMF) may be a network function that manages access and mobility of the UE. For example, the AMF may perform a network function of managing registration, connection, reachability, and mobility, identifying access, performing authentication, and generating a mobility event.

The session management function (SMF) may be a network function that manages a packet data network (PDN) connection provided to the UE. The PDN connection may be referred to as a name of a packet data unit (PDU) session. For example, the SMF may perform a function of establishing, modifying, and releasing a session, a session management function through maintenance of a tunnel between the UPF and the RAN required therefor, a function of managing allocation of an Internet protocol (IP) address of the UE, and network functions of selecting and controlling a user plane, controlling traffic processing by the UPF, and collecting and controlling charging data.

The policy control function (PCF) may be a network function that applies a service policy of a mobile communication service provider for the UE, a charging policy, and a policy for a PDU session.

The unified data management (UDM) may be a network function that stores information on a subscriber. For example, the UDM may perform a function of generating authentication information for 3GPP security, processing a user ID, managing a list of network functions supporting the UE, and managing subscription information.

The network exposure function (NEF) may be a function of providing information on the UE to a server outside the 5G network. Further, the NEF may provide a function of offering information required for a 5G network service and storing the information in the UDR.

The user plane function (UPF) may be a function of serving as a gateway that transfers user data (PDU) to a data network (DN). More specifically, the UPF may serve to process data so that the data transmitted by the UE can be transferred to an external network or the data from the external network can be transferred to the UE. For example, the UPF may perform network functions of serving as an anchor between radio access technologies (RATs), routing and forwarding packets, inspecting packets, applying a user plane policy, making a traffic usage report, and performing buffering.

The network repository function (NRF) may perform a function of discovering an NF.

The authentication server function (AUSF) may perform UE authentication in a 3GPP access network and a non-3GPP access network.

The network slice selection function (NSSF) may perform a function of selecting network slice instance provided to the UE.

The data network (DN) may be a data network through which the UE transmits and receives data in order to use a service of a network operator or a 3rd party service.

In an embodiment of the disclosure, equipment (i.e., AF) located in the DN may use an N6 interface (user plane, in-band) in order to exchange control messages with the UPF.

According to an embodiment of the disclosure, a scheme of controlling the flow of the Internet protocol is provided to allow a network device or a network function located inside or outside the 5G core network to provide an efficient AF service through the use of a service provided by the user plane function (UPF).

FIG. 2 illustrates an example of a TCP/IP protocol stack and an IP layer (PIv4-based) datagram header (packet header) according to an embodiment of the present disclosure.

According to an embodiment of the disclosure, each of the user plane function (UPF) and the application function (AF) may include a router and a server device and may communicate through an N6 interface by using a transmission control protocol (TCP)/Internet protocol (IP) protocol stack in order to transmit user data. The router device may basically include an Internet protocol (IP) layer. Accordingly, an in-band protocol that transmits a control message between the UPF and the AF may exist on the IP layer.

The IP datagram header may include a protocol field. Based on IPv6, a next header field may perform a function of the protocol field. In the disclosure, the description is made based on the IPv4 protocol, but the disclosure may be equally applied to the IPv6 protocol. The protocol field (next header field based on IPv6) is an 8-bit field and may include data indicating a higher-layer protocol using a service of an IP layer. Various types of higher-layer protocols, such as a TCP, a user datagram protocol (UDP), an Internet control message protocol (ICMP), and an Internet group management protocol (IGMP) may use the IP layer.

In an embodiment of the disclosure, the following description is made based on a situation where a UPF control message protocol (UCMP) is used as the in-band protocol. However, the disclosure is not limited thereto, and other in-band protocols may be used in the disclosure.

The UCMP may receive allocation of one of non-used protocol numbers. In the disclosure, it is assumed that the UCMP receives allocation of no. 144. However, a new protocol name and a protocol number allocated thereto are not limited to the embodiment of the disclosure, and various names and numbers may be used.

Figure 3:
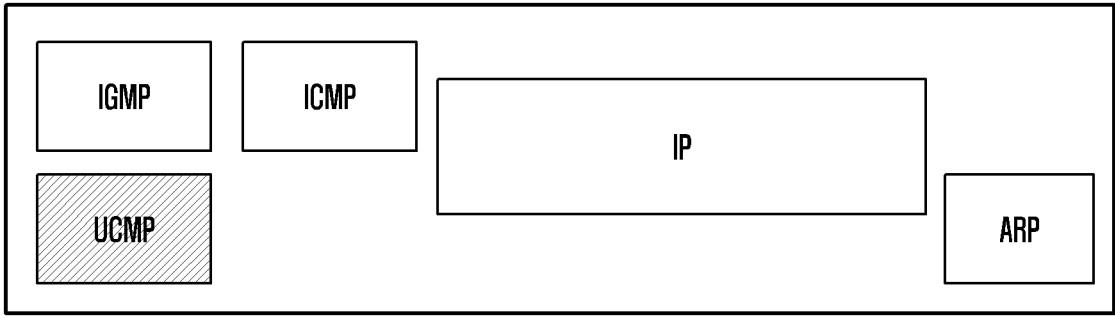
FIG. 3 illustrates an example of an IP layer including a UCMP according to an embodiment of the present disclosure.

FIG. 3 illustrates an example of an IP layer including a UCMP according to an embodiment of the present disclosure.

According to an embodiment of the disclosure, the UCMP may be included in the IP layer along with the existing IGMP, ICMP, and address resolution protocol (ARP). Further, the UCMP may exist above the IP layer. The UCMP shown in FIG. 3 is illustrated based on IPv4 but is not limited thereto, and may be equally applied to the case of IPv6.

Figure 4:
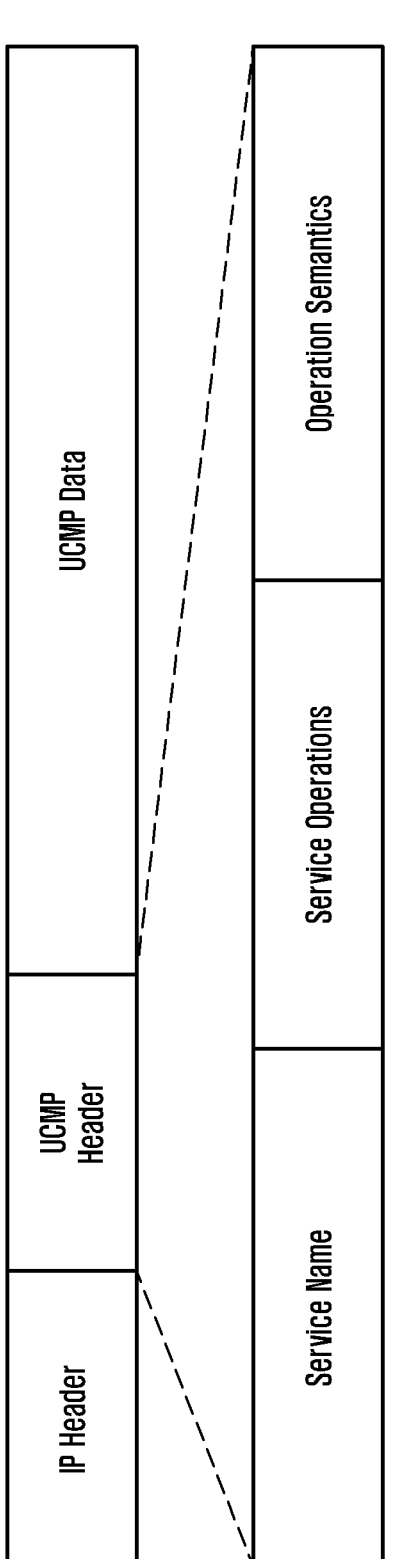
FIG. 4 illustrates an example of IP datagram and a UCMP message format including UCMP messages according to an embodiment of the present disclosure.

FIG. 4 illustrates an example of IP datagram and a UCMP message format including UCMP messages according to an embodiment of the present disclosure.

As described above, a value of 144 indicating the UCMP may be input into the protocol field of the IP header. A UCMP header may include a UPF service name, a service operation, and an operation semantic value. UCMP data may include parameter values required for the UPF service. The message format is not limited to the example.

Figure 5:
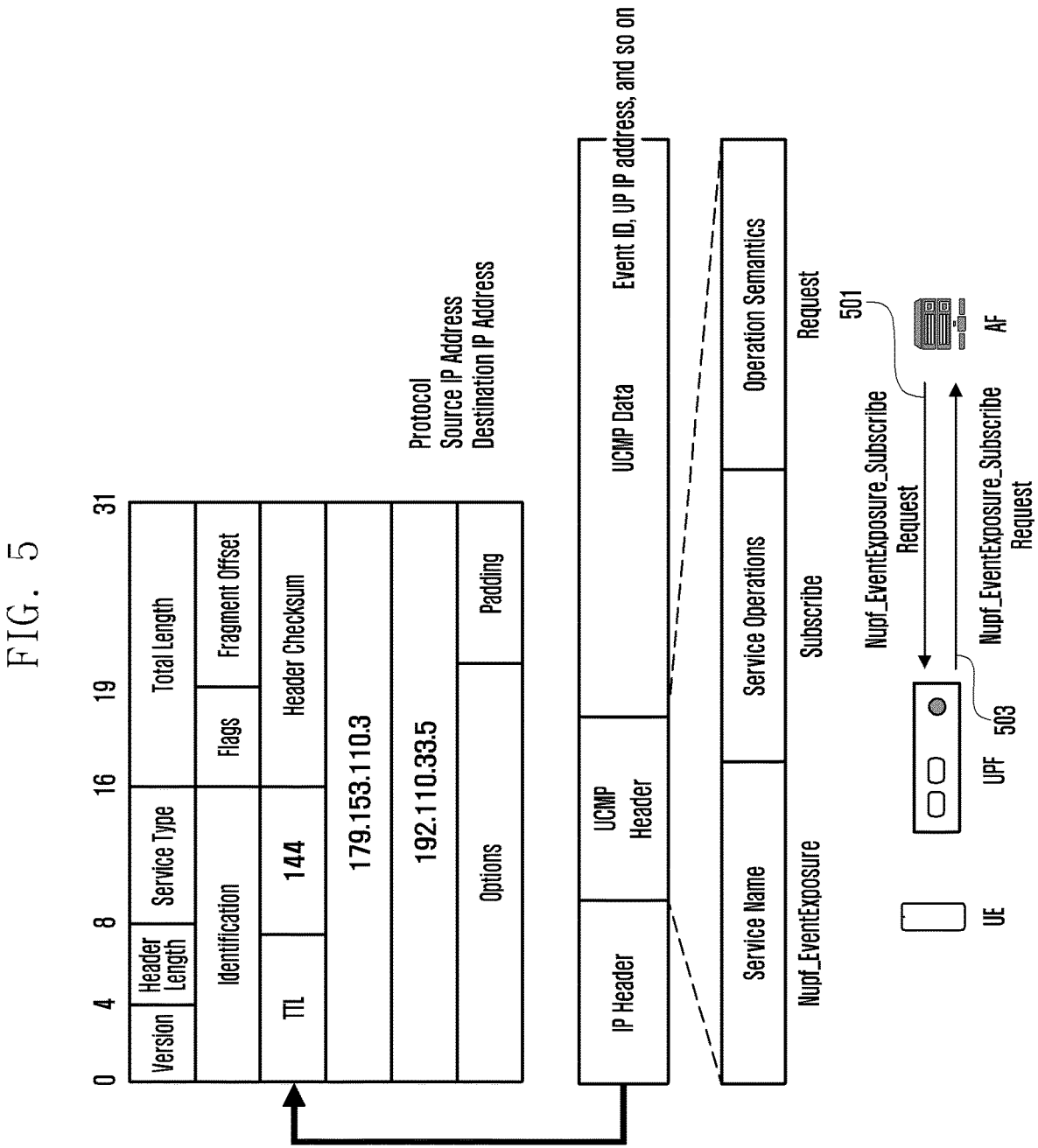
FIG. 5 illustrates an example of an operation of the UCMP according to an embodiment of the present disclosure.

FIG. 5 illustrates an example of the operation of the UCMP according to an embodiment of the present disclosure.

Referring to FIG. 5, the AF corresponding to an external server may makes a request for subscribing to the UPF service to the UPF in order to use a specific service of the UPF. To this end, the AF may generate a UCMP message and transmit IP datagram including the generated message to the UPF. As described above, the value of "144" may be input into the protocol field of the IP header in order to indicate that the corresponding IP datagram includes the UCMP message. The IP address "179.153.110.3" of the AF may be input into a source IP address field, and the IP address "192.110.33.5" of the UE may be input into a destination address field.

According to an embodiment of the disclosure, the following values may be input into the UCMP header. A value of "Nupf_EventExposure" corresponding to a UPF service name may be input into the service name field. The value input into the service name field indicates a name of a service for which the AF makes a request to the UPF.

According to an embodiment of the disclosure, a value of "Subscribe" indicating service subscription may be input into the service operation field. The value input into the service operation field indicates an operation of a service for which the AF makes a request to the UPF.

According to an embodiment of the disclosure, a value of "Request" indicating a service request may be input into the operation semantic field. The value input into the operation semantic field may indicate a detailed operation of the service operation that is the value input into the service operation field.

According to an embodiment of the disclosure, the UCMP data field may include parameter values required for the corresponding service subscription request. The parameter values may be various values such as an event ID, a UE IP address, a generic public subscription identifier (GPSI), a data network name (DNN), and single network slice selection assistance information (S-NSSAI) but are not limited to the examples.

According to an embodiment of the disclosure, the corresponding IP datagram is transmitted to a PDU session anchor (PSA) UPF that is a home router of the UE in operation 501. The UPF may process the header of the IP datagram. At this time, the UPF has "144" of the value of the protocol field, and thus recognize that the IP datagram includes the UCMP message. That is, the UPF receiving the corresponding IP datagram may identify that the corresponding IP datagram includes a UCMP message making a request for a service to the UPF serving the corresponding UE rather than the corresponding IP datagram includes user data transmitted to the user (UE). The UPF may analyze the UCMP message and process service subscription requested based on the content of the UCMP. The UPF may not transmit the corresponding IP datagram to the UE and may delete or discard the corresponding IP datagram.

Thereafter, the UPF may transmit the result of processing the requested service subscription to the AF. To this end, the UPF may generate a UCMP message and the following values may be input into the UCMP header. A value of "Nupf_EventExposure" corresponding to a UPF service name may be input into the service name field. A value of "Subscribe" indicating service subscription may be input into the service operation field. A value of "Response" indicating a response to the service request may be input into the operation semantic field. The UCMP data field may include parameter values required for the corresponding response to the service subscription request.

The IP datagram and UCMP protocol message illustrated in FIG. 5 are only examples, but the IP datagram and the UCMP message are not limited to the format and may be variously changed according to a system configuration or a UPF service for which the AF makes a request.

FIG. 6 illustrates a flow of a service Internet protocol transmitted to the UE in order to use the AF service according to an embodiment of the present disclosure.

Social network service (SNS) and instant messenger (IM) applications are representative services that many people often use. The services include a push notification function of, when data that may be transmitted to users is generated, immediately transmitting the data to the UE. When each service has the push notification function, the network has a lot of congestion, and thus UE platform companies (e.g., Apple, Google, and the like) build their own push notification servers to provide these functions instead. However, since the servers built by the UE platform companies may periodically transmit keepalive messages to each UE, they still cause network congestion and UE battery consumption.

The keepalive message is a method designed to prevent a change in a public IP address of the UE. Most mobile communication network service providers may allocate one or more IP addresses in order to provide a network connectivity service to the subscriber UE. The allocated IP addresses may have the form of an IPv4 or IPv6 address. In the case of the IPv6 address, the number of IP Addresses is almost infinite, and thus the public network may allocate valid public IP addresses to UEs. However, in the case of IPv4 where the number of addresses is very limited, a very high cost may be paid to allocate a public IPv4 address to each UE. To this end, most mobile communication network service providers allocate, to the UE, private IP addresses which are valid in the mobile communication network but are invalid in the public network. To this end, the mobile communication network service provider uses network address translation (NAT) equipment.

The NAT equipment may be embedded into a home router of the mobile communication network or the UPF corresponding to a gateway. When the UE transmits data to the public network, a public IP address is allocated to the UE, a private IP address allocated within the mobile communication network is changed to the public IP address, and data of the UE is transmitted to the public network. At this time, the NAT equipment may store mapping information of the private IP address and the public IP address of the UE in a table, changes the private IP address to a public IP address of a packet from the public network to the UE, and change a private IP Address of a packet from a mobile communication network to the public network to the public IP address.

Mapping information of the IP information managed by the NAT may be 1:1 mapping information of private IP addresses and public IP addresses or, unlike this, may be mapping information configured in other methods, not the 1:1 method, through a combination of IP addresses and port numbers. That is, mapping information between IP information may be configured in mapping methods such as 1:1, n:m, and 1:n, and is not limited to one mapping method.

The mapping information may not be stored in a table forever. Since the public IP addresses are expensive resources, a time may be configured to each piece of the mapping information. When the time expires due to no traffic of the allocated IP address for a specific time, mapping information may disappear and the public IP address allocated to the UE cannot be used to transmit data to the corresponding UE anymore. However, when data to the corresponding public IP address is generated, the time is reset and a validity time of the mapping information increases by a time corresponding to the timer. Taking advantage of this, each push notification server may generate a dummy message corresponding to keepalive and periodically transmit the dummy message to the UE. The message may make mapping information between the public IP address and the private IP address refresh and, accordingly, a validity period of the mapping information may continue and thus the server can transmit data to the UE.

Since the NAT equipment is not standardized equipment, a time value allocated to each piece of the mapping information may be different for each equipment. Accordingly, the push notification server transmits the keepalive message according to the minimum time value period of all NAT equipment.

Therefore, the disclosure provides a UPF service to solve the problems generated due to the NAT equipment (i.e., a problem of a UE battery consumed to receive a keepalive message and transmit a response message to the keepalive message, and network congestion and load generated to transmit the keepalive message and the response message to the UE and the server).

A new UPF service provided in the disclosure is described below:

Nupf_NAT_Get service operation:
+Description: The NF consumer requests the UPF to provide the information of the NAT,
+Inputs, Required: public UE IP address/port number, GPSI, Indication of requesting information,
for example, list of available services, Type of NAT, Value of Timer, Time to expire, and so on, and
+Outputs, Required: requested information; and
Nupf_NAT_Execute service operation:
+Description: The NF consumer requests the UPF to execute some operation on the NAT,
+Inputs, Required: public UE IP address/port number, GPSI, Type of requesting operation,
for example, extended timer, Reset timer, Set timer to value X, Not expiring timer (expiring timer), and so on,
+Inputs, Optional: parameters for the operation,
+Outputs, Required: results, and
+Outputs, Optional: value according to results.

The Nupf_NAT service may include two types of service operations such as Nupf_NAT_Get service operation and Nupf_NAT_Execute service operation. The names of the service operations are examples and may be changed to other names, and other service operations may be included in addition to the listed service operations.

The Nupf_NAT_Get service is a service making a request for NAT equipment-related information. Information that can be requested may be list of available services, a type of NAT, a value of timer, time to expire, and so on but is not limited thereto.

The Nupf_NAT_Execute service is a service making a request for any operation to the NAT equipment. A list of operations that can be requested includes an extended timer, a reset timer, a set timer to value X, a not expiring timer (expiring timer), and so on but is not limited thereto.

The following description is information that can be acquired using the Nupf_NAT_Get service. It is an example for NAT information but is not limited thereto:

List of available services: send a list of available service for requested AF;
Type of NAT: send Type of NAT:
No NAT, Static NAT, Dynamic NAT, PAT (Port Address Translation), SNAT, DNAT, Twice-NAT, Hairpin NAT, NAT Loopback;
Value of expiring timer: send the periodicity value of timer;
Time to timer expiring: send the time to expire; and
Notification of timer expiring: send notification when/ before timer is expired.

The following description is a service operation that can be requested using the Nupf_NAT_Execute service. It is an example for the service operation that can be requested to the NAT but is not limited thereto:

No expiring timer: no expiring timer for the entry;
Set expiring timer: set the expiring timer to value X;
Extend expiring timer: extend the expiring timer value to some value; and
Reset expiring timer: reset the expiring timer.

Figure 7:
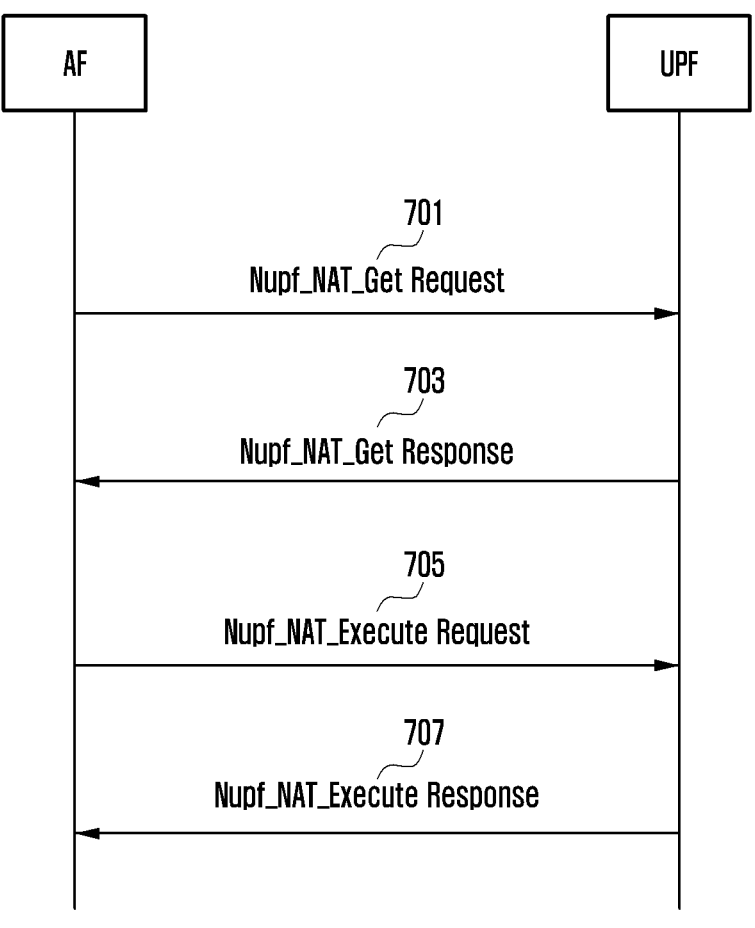
FIG. 7 illustrates a signaling flow of a procedure for using the Nupf_NAT_Get service and the Nupf_NAT_Execute service according to an embodiment of the present disclosure.

FIG. 7 illustrates a signaling flow of a procedure for using the Nupf_NAT_Get service and the Nupf_NAT_Execute service according to an embodiment of the present disclosure.

The AF may transmit an Nupf_NAT_Get Request message to the UPF in order to use the Nupf_NAT_Get service in operation 701, and the UPF may transmit Nupf_NAT_Get Response including information for which the AF made the request to the AF in operation 703.

The AF may transmit an Nupf_NAT_Execute Request message to the UPF in order to use the Nupf_NAT_Execute service in operation 705, and the UPF may transmit Nupf_NAT_Execute Response including information for which the AF made the request to the AF in operation 707.

Figure 8:
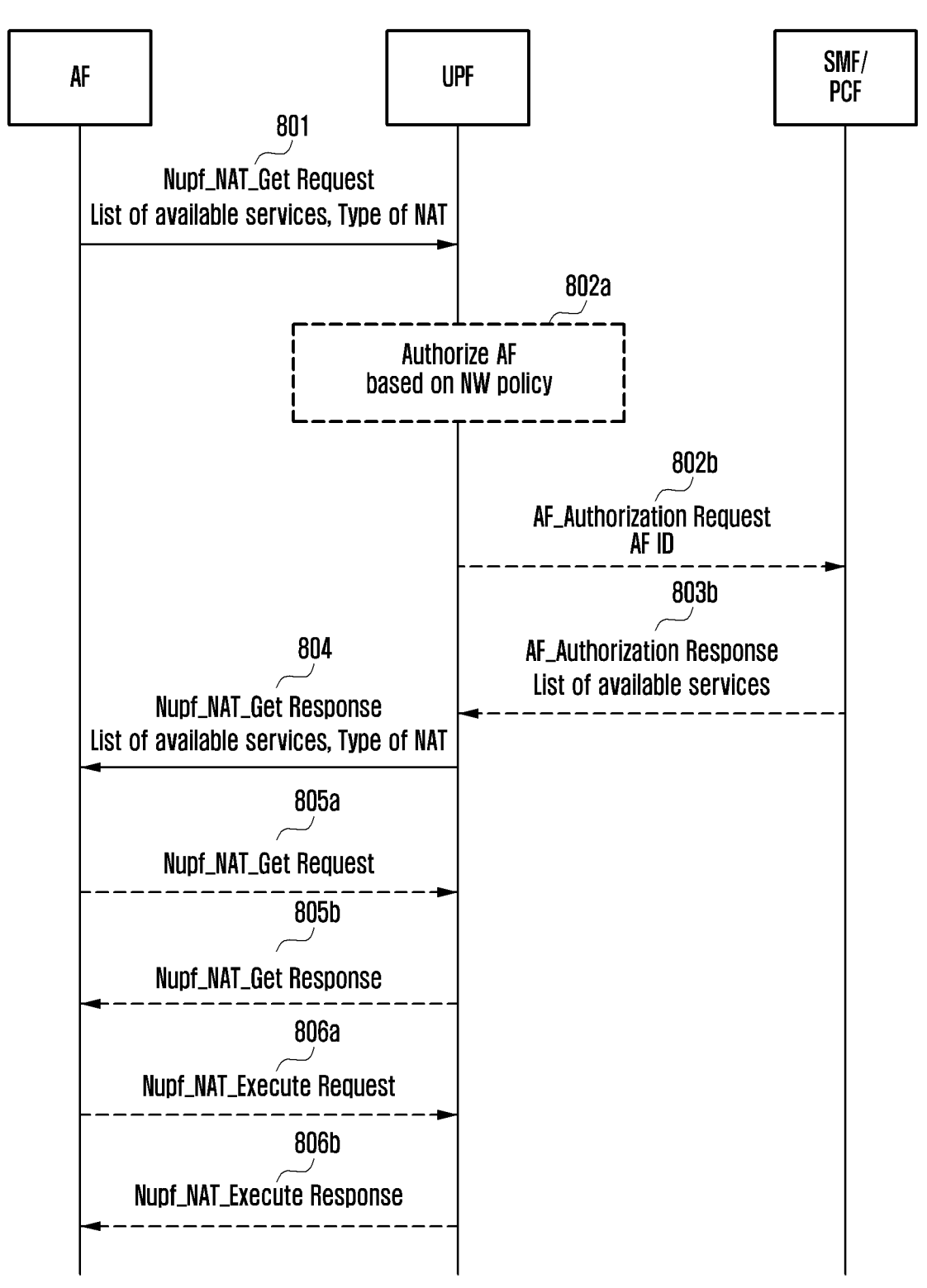
FIG. 8 illustrates a signaling flow of a procedure for using the Nupf_NAT_Get service and the Nupf_NAT_Execute service according to an embodiment of the present disclosure.

FIG. 8 illustrates a signaling flow of a procedure for using the Nupf_NAT_Get service and the Nupf_NAT_Execute service according to an embodiment of the present disclosure.

In operation 801, the AF may make a request for a list of available services and information on a type of NAT through an Nupf_NAT_Get Request message.

In operation 802*a* or 802*b*/803*b*, if information on services which the UPF can provide to each AF is configured, the UPF may determine a list of services which can be provided to the corresponding AF by using the information in operation 802*a*. If information on services which the UPF can provide to each AF is not configured, the UPF may transmit an AF ID to the SMF or the PCF and make a request therefor in order to authenticate the AF in operation 802*b* and receive a list of available services which can be provided to the corresponding AF from the SMF or the PCF in response to the request in operation 803*b*.

In operation 804, the UPF may transmit the Nupf_NAT_Get Response message including the list of available services which can be provided to the AF and the value for the type of NAT (e.g., static NAT, PAT, and so on) determined in operation 802*a* or 802*b*/803*b* to the AF.

In operations 805*a* to 806*b*, the AF may make a request for a desired service to the UPF according to the list of available services and the type of NAT received in operation 804 to the UPF and receive a response thereto from the UPF.

Subsequently, examples of information that can be requested or operations that can be requested according to the list of available services and the type of NAT which can be provided to the AF are described:

Type of NAT:
Decide the parameters of service request or operation (e.g., Static NAT: only IP address, PAT: a pair of IP address and port number);
Value of expiring timer:
Adjust periodicity of sending a keepalive message;
Time to timer expiring:
Wait for sending a keepalive message right before expiring timer;
Notification of timer expiring (Dynamic value of timer):
Once receiving a notification, sending a keepalive message;

No expiring timer:
No sending a keepalive message;
Set expiring timer:
Set the expiring timer to value X and send periodically a keepalive message based on value X;
Extend expiring timer:
Not send a keepalive message but extend expiring timer before expiring (no signaling to UE so no radio resource consumption); and
Reset expiring:
Not send a keepalive message but reset expiring timer before expiring (no signaling to UE so no radio resource consumption).

Among the AF operations, services for Reset expiring/Extend expiring timer extends or resets the timer of NAT instead of transmitting the keepalive message, and thus, when the AF uses such a service, the UPF does not need to transmit the keepalive message to the UE, and accordingly, the UE battery is not consumed and network congestion due to signal transmission and reception between the UPF and the UE may be prevented unlike the situation where the existing situation where the keepalive message is transmitted to the UE.

According to an embodiment of the disclosure, the list of available services provided to the AP may be different, which is due to a contract between the AF ($3^{rd}$ party) and mobile communication network operators and a type of service provided by the AF.

The operations of the AF according to the list of available services are only embodiments, and the operations of the AF are not limited to the above-described operations.

Figure 9:
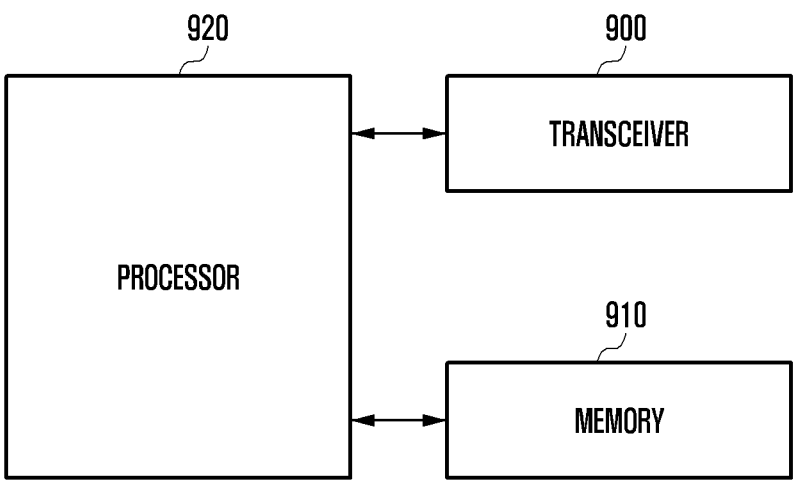
FIG. 9 illustrates an example of a configuration of a UE according to an embodiment of the present disclosure.

FIG. 9 illustrates an example of a configuration of a UE according to an embodiment of the present disclosure.

The UE according to an embodiment of the disclosure may include a processor 920 configured to control overall operation of the UE, a transceiver 900 including a transmitter and a receiver, and a memory 910. Of course, the disclosure is not limited thereto, and the UE may include more or fewer elements than those illustrated in FIG. 9.

According to an embodiment of the disclosure, the transceiver 900 may transmit and receive signals to and from network entities or other UEs. Signals transmitted and received to and from the network entities may include control information and data. Further, the transceiver 900 may receive a signal through a radio channel, output the signal to the processor 920, and transmit the signal output from the processor 920 through the radio channel.

According to an embodiment of the disclosure, the processor 920 may control the UE to perform at least one operation among the embodiments. Meanwhile, the processor 920, the memory 910, and the transceiver 900 are not necessarily implemented by separate modules but may be implemented as one element in the form of a single chip. Further, the processor 920 and the transceiver 900 may be electrically connected. In addition, the processor 920 may be an application processor (AP), a communication processor (CP), a circuit, an application-specific circuit, or at least one processor.

According to an embodiment of the disclosure, the memory 910 may store data such as a basic program for the operation of the UE, an application program, and configuration information. Particularly, the memory 910 provides the stored data according to a request from the processor 920. The memory 910 may be configured by storage media such as ROM, RAM, a hard disk, a CD-ROM, and a DVD, or a combination of the storage media. The number of memories 910 may be plural. The processor 920 may implement the embodiments, based on a program for implementing the embodiments of the disclosure stored in the memory 910.

Figure 10:
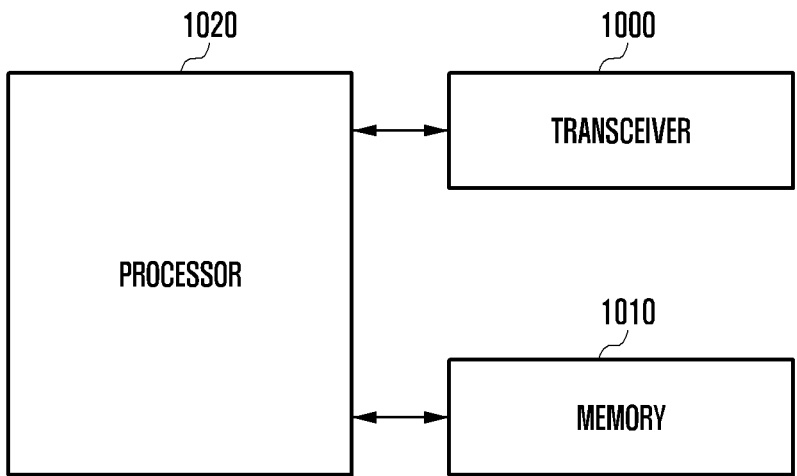
FIG. 10 illustrates an example of a configuration of a network entity according to an embodiment of the present disclosure.

FIG. 10 illustrates an example of a configuration of a base station or a network entity according to the present disclosure.

The network entity according to an embodiment of the disclosure may include a processor 1020 configured to control the overall operation of the network entity, a transceiver 1000 including a transmitter and a receiver, and a memory 1010. Of course, the disclosure is not limited to the example, and the network entity may include more or fewer elements than those illustrated in FIG. 10.

According to an embodiment of the disclosure, the transceiver 1000 may transmit and receive signals to and from at least one of other network entities or the UE. Signals transmitted and received to and from at least one of other network entities or the UE may include control information and data.

According to an embodiment of the disclosure, the processor 1020 may control the network entity to perform one operation among the embodiments. Meanwhile, the processor 1020, the memory 1010, and the transceiver 1000 are not necessarily implemented by separate modules but may be implemented as one element in the form of a single chip. Further, the processor 1020 and the transceiver 1000 may be electrically connected. In addition, the processor 1020 may be an application processor (AP), a communication processor (CP), a circuit, an application-specific circuit, or at least one processor.

According to an embodiment of the disclosure, the memory 1010 may store data such as a basic program for the operation of the network entity, an application program, and configuration information. Particularly, the memory 1010 provides the stored data according to a request from the processor 1020. The memory 1010 may be configured by storage media such as ROM, RAM, a hard disk, a CD-ROM, and a DVD, or a combination of the storage media. The number of memories 1010 may be plural. The processor 1020 may implement the embodiments, based on a program for implementing the embodiments of the disclosure stored in the memory 1010.

It should be noted that the above-described configuration diagrams, illustrative diagrams of control/data signal transmission methods, illustrative diagrams of operation procedures, and structural diagrams are not intended to limit the scope of the disclosure. That is, all constituent elements, entities, or operation steps described in the embodiments of the disclosure should not be construed as being essential for the implementation of the disclosure, and the disclosure may be implemented without impairing the essential features of the disclosure by including only some constituent elements. Also, the above respective embodiments may be employed in combination, as necessary. For example, the methods provided in the disclosure may be partially combined with each other to operate a network entity and a terminal.

The above-described operations of a base station or terminal may be implemented by providing any unit of the base station or terminal device with a memory device storing corresponding program codes. That is, a controller of the base station or terminal device may perform the above-described operations by reading and executing the program codes stored in the memory device by means of a processor or central processing unit (CPU).

Various units or modules of an entity, a base station device, or a terminal device may be operated using hardware circuits such as complementary metal oxide semiconductor-based logic circuits, firmware, or hardware circuits such as combinations of software and/or hardware and firmware and/or software embedded in a machine-readable medium. For example, various electrical structures and methods may be implemented using transistors, logic gates, and electrical circuits such as application-specific integrated circuits.

When the methods are implemented by software, a computer-readable storage medium for storing one or more programs (software modules) may be provided. one or more programs stored in the computer-readable storage medium may be configured for execution by one or more processors within the electronic device. The at least one program includes instructions that cause the electronic device to perform the methods according to various embodiments of the disclosure as defined by the appended claims and/or disclosed herein.

These programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. In addition, a plurality of such memories may be included in the electronic device.

In addition, the programs may be stored in an attachable storage device which can access the electronic device through communication networks such as the Internet, Intranet, local area network (LAN), wide LAN (WLAN), and storage area network (SAN) or a combination thereof. Such a storage device may access the electronic device via an external port. Also, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments set forth herein, but should be defined by the appended claims and equivalents thereof. That is, it will be apparent to those skilled in the art that other variants based on the technical idea of the disclosure may be implemented. Also, the above respective embodiments may be employed in combination, as necessary. As an example, the methods provided in the disclosure may be partially combined with each other to operate a base station and a terminal. Moreover, although the above embodiments have been described based on the 5G or NR system, other variants based on the technical idea of the embodiments may also be implemented in other communication systems such as LTE, LTE-A, or LTE-A-Pro systems.

Although specific embodiments have been described in the detailed description of the disclosure, it will be apparent that various modifications and changes may be made thereto without departing from the scope of the disclosure. There-fore, the scope of the disclosure should not be defined as being limited to the embodiments set forth herein, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first network entity in a wireless communication system, the method comprising:

transmitting, to a second network entity including a network address translation (NAT) function, a first request message for a list of services that is provided to the first network entity and type information of the NAT;

receiving, from the second network entity, a first response message comprising the list of the services that is provided to the first network entity and the type information of the NAT;

transmitting, to the second network entity, an operation indication message indicating an operation associated with a timer of Internet protocol (IP) address mapping information managed by the NAT; and receiving, from the second network entity, a response message in response to transmitting the operation indication message, wherein the operation indication message is not trans-ferred to a user equipment (UE) in case that the operation indication message indicates an extension or a reset of the timer.

2. The method of claim 1, further comprising:

transmitting, to the second network entity, a second request message indicating a request for at least one of a piece of period information of the timer, expiration time information of the timer, or expiration notification information of the timer; and receiving, from the second network entity, a second response message corresponding to the second request message and comprising at least one of a piece of the period information of the timer, the expiration time information of the timer, or the expiration notification information of the timer.

3. The method of claim 1, wherein the first request message or the operation indication message is transmitted while being included in an IP datagram in a form of a UPF control message protocol (UCMP) message, and wherein a value corresponding to a UCMP is set into a protocol field included in a header of the IP datagram.

4. The method of claim 3, wherein a header of the UCMP message comprises a service name field, a service operation field, and an operation semantic field.

5. A method performed by a second network entity including a network address translation (NAT) function in a wireless communication system, the method comprising:

receiving, from a first network entity, a first request message for a list of services that is provided to the first network entity and type information of the NAT;

transmitting, to the first network entity, a first response message comprising the list of the services that is provided to the first network entity and the type infor-mation of the NAT;

receiving, from the first network entity, an operation indication message indicating an operation associated with a timer of Internet protocol (IP) address mapping information managed by the NAT; and transmitting, to the first network entity, a response mes-sage in response to receiving the operation indication message, wherein the operation indication message is not trans-ferred to a user equipment (UE) in case that the operation indication message indicates an extension or a reset of the timer.

6. The method of claim 5, further comprising:

transmitting, to a third network entity, identification infor-mation of the first network entity; and receiving, from the third network entity, the list of the services that is provided to the first network entity.

7. The method of claim 5, further comprising:

receiving, from the first network entity, a second request message indicating a request for at least one of a piece of period information of the timer, expiration time information of the timer, or expiration notification information of the timer; and transmitting, to the first network entity, a second response message corresponding to the second request message and comprising at least one of a piece of the period information of the timer, the expiration time informa-tion of the timer, or the expiration notification infor-mation of the timer.

8. A first network entity in a wireless communication system, the first network entity comprising:

a transceiver; and a processor operably coupled to the transceiver, the pro-cessor configured to:

transmit, to a second network entity including a net-work address translation (NAT) function, a first request message for a list of services that is provided to the first network entity and type information of the NAT;

receive, from the second network entity, a first response message comprising the list of the services that is provided to the first network entity and the type infor-mation of the NAT;

transmit, to the second network entity, an operation indi-cation message indicating an operation associated with a timer of Internet protocol (IP) address mapping information managed by the NAT; and receive, from the second network entity, a response mes-sage in response to transmitting the operation indica-tion message, wherein the operation indication message is not trans-ferred to a user equipment (UE) in case that the operation indication message indicates an extension or a reset of the timer.

9. The first network entity of claim 8, wherein the processor is further configured to:

transmit, to the second network entity, a second request message indicating a request for at least one of a piece of period information of the timer, expiration time information of the timer, or expiration notification information of the timer; and receive, from the second network entity, a second response message corresponding to the second request message and comprising at least one of a piece of the period information of the timer, the expiration time information of the timer, or the expiration notification information of the timer.

10. The first network entity of claim 8, wherein the first request message or the operation indication message is transmitted while being included in an IP datagram in a form of a UPF control message protocol (UCMP) message, and wherein a value corresponding to a UCMP is set into a protocol field included in a header of the IP datagram.

11. The first network entity of claim 10, wherein a header of the UCMP message comprises a service name field, a service operation field, and an operation semantic field.

12. A second network entity including a network address translation (NAT) function in a wireless communication system, the second network entity comprising:

a transceiver; and a processor operably coupled to the transceiver, the processor configured to:

receive, from a first network entity, a first request message for a list of services that is provided to the first network entity and type information of the NAT;

transmit, to the first network entity, a first response message comprising the list of the services that is provided to the first network entity and the type information of the NAT;

receive, from the first network entity, an operation indication message indicating an operation associated with a timer of Internet protocol (IP) address mapping information managed by the NAT; and transmit, to the first network entity, a response message in response to receiving the operation indication message, wherein the operation indication message is not transferred to a user equipment (UE) in case that the operation indication message indicates an extension or a reset of the timer.

13. The second network entity of claim 12, wherein the processor is further configured to:

transmit, to a third network entity, identification information of the first network entity; and receive, from the third network entity, the list of the services that is provided to the first network entity.

14. The second network entity of claim 12, wherein the processor is configured to:

receive, from the first network entity, a second request message indicating a request for at least one of a piece of period information of the timer, expiration time information of the timer, or expiration notification information of the timer; and transmit, to the first network entity, a second response message corresponding to the second request message and comprising at least one of a piece of the period information of the timer, the expiration time information of the timer, or the expiration notification information of the timer.

* * * * *